United States Patent [19]

Meyer et al.

[11] 3,815,056

[45] June 4, 1974

[54] CONTINUOUS SURFACE WAVE DEVICE

[75] Inventors: Paul C. Meyer, Newton; Manfred B. Schulz, Sudbury, both of Mass.

[73] Assignee: Raytheon Company, Lexington, Mass.

[22] Filed: Mar. 29, 1973

[21] Appl. No.: 345,937

Related U.S. Application Data

[63] Continuation of Ser. No. 170,937, Aug. 11, 1971, abandoned.

[52] U.S. Cl. .............................. 333/30 R, 310/9.8

[51] Int. Cl. .............................. H03h 9/30

[58] Field of Search ......... 330/5.5; 333/6, 30 R, 71, 333/72

[56] References Cited

UNITED STATES PATENTS 3,500,461 3/1970 Epstein et al. .................. 333/30 R 3,609,602 9/1971 De Vries et al. ............ 333/30 R X 3,634,774 1/1972 Carr ............................ 330/5.5 X

*Primary Examiner*—Paul L. Gensler

*Attorney, Agent, or Firm*—Joseph D. Pannone; Milton D. Bartlett; Herbert W. Arnold

[57] ABSTRACT

A surface wave structure such as a surface acoustic wave delay line in which the surface is curved such that surface waves continue on the surface until absorbed by the losses in the structure which may be a quartz crystal, thereby greatly increasing the total delay time available with a limited amount of material.

17 Claims, 4 Drawing Figures

CONTINUOUS SURFACE WAVE DEVICE

This is a continuation of application Ser. No. 170,937 filed Aug. 11, 1971, now abandoned.

BACKGROUND OF THE INVENTION

This invention relates to continuous surface wave structures and more particularly to a continuous surface wave delay line consisting of either one or a plurality of interdigital electrode arrays disposed upon the surface of a surface wave conductive medium such as piezoelectric material in which launched surface waves may traverse the surface one or more times. Surface wave devices are of importance in many electronic applications because the wave velocity of surface waves is approximately $10^5$ times smaller than the velocity of electromagnetic radiation, thus surface wave devices may be made many orders of magnitude smaller than comparable electromagnetic wave devices. Such devices are directional couples, circulators, isolators, resonators and delay lines. Additionally, a much greater delay is possible with surface acoustic waves than with electromagnetic waves due to the propagation velocity which ranges typically between $10^3$ meters per sec. to $10^4$ meters per sec. The present invention enables even greater delays to be achieved without increasing the required amount of surface wave conductive material.

In surface wave devices of the prior art and particularly in prior art surface wave delay lines, these devices are too large and costly for certain applications in which cost and size are critical, such as, delay lines, filters, etc., in satellites or in small electronic instruments. Surface wave devices of the prior art and their operating characteristics are summarized in the *Proceedings of the IEEE*, Vol. 58, No. 8, August 1970 in an article entitled *Surface Elastic Waves* by Richard M. White.

Techniques, such as apodization or varying the amount of overlap of the individual electrodes of interdigital electrode arrays disposed upon the surface of a suitable medium for propagation of surface acoustic waves, may effectively be used in the present invention. Piezoelectric materials such as quartz crystals, lithium niobiate ($LiNbO_3$), $Bi_{12}GeO_{20}$, ZnO, CdS, GaAs and others may be effectively utilized in the present invention since the amount of piezoelectric material required is less than that which is required by systems of the prior art.

SUMMARY OF THE INVENTION

A continuous surface wave device, such as a continuous surface wave delay line using curved surfaces such that the propagated surface acoustic waves are reentrant upon the electrodes from which they are launched, is disclosed. The geometric configuration of the device may be cylindroidal, cylindrical, disc-shaped, or any other desired curvilinear surface such that surface acoustic waves may traverse said surface either in circular reentrant paths or in a spiral path, such as on the surface of the cylinder. An exemplary medium suitable for the propagation of surface acoustic waves around curvilinear surfaces comprises Y-cut crystalline quartz in which the Y-faces are optically polished to a flat finish and in which the X-axis ends are polished to a cylindrical shape with the cylinder axis parallel to the Z-axis. Interdigital aluminum electrodes may be fabricated on both Y-faces with an orientation such that surface acoustic waves are generated along the X-axis and around the cylindrical surfaces at a fundamental operating frequency of about 60 MHz although, of course, other operating frequencies may be obtained. The only requirement for low loss propagation of the acoustic wave on such a cylindrical surface is that the acoustic wave length be short compared to the radius of curvature of the curved propagation surface. The electrodes may be deposited upon the surface of the piezoelectric propagating medium in accordance with standard thin film techniques and may be aluminum or other suitable electrode material evaporated thereon. When a surface acoustic wave is launched from a comb filter of interdigital electrodes upon the surface of a curvilinear medium such as a cylindroid, the path from one end back upon itself is equivalent to a cavity with resonances at points where the path length is an integral number of acoustic wavelengths, thus an extremely low insertion loss exists at the resonance points. The range of operating frequencies is determined by the spacing of the interdigital electrodes in the comb arrays.

It is thus an object of the present invention to provide an improved continuous surface wave delay line using curvilinear surfaces.

It is an additional object of the present invention to provide an improved surface acoustic wave device in which longer delay times may be achieved with a relatively small portion of propagating material.

It is yet an additional object of the present invention to provide a continuous surface wave acoustic device in which a propagating wave may be launched and propagated continuously along the surface of a propagating medium for a predetermined number of times.

It is yet an additional object of the present invention to provide a surface wave device structure in which launched acoustic waves are reentrant upon the electrodes from which they were launched.

Other objects and advantages of the invention will become apparent and may be more readily understood by reference to the accompanying drawings wherein:

DESCRIPTION OF THE PREFERRED EMBODIMENTS

Figures 1, 2, 3, 4:
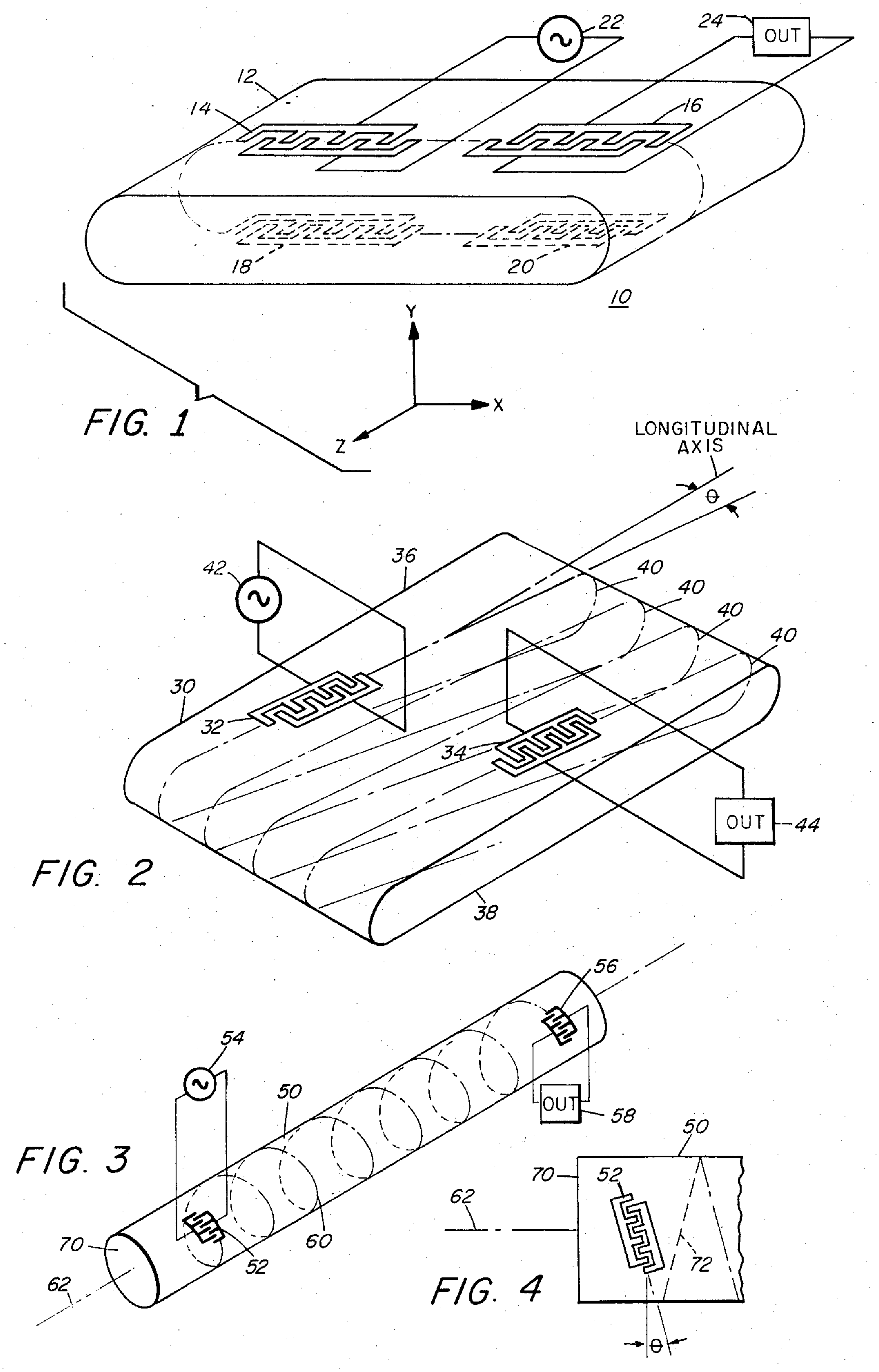
FIG. 1 is an embodiment of the invention in which a cylindroid upon which surface acoustic waves are launched parallel to the sides of the cylindroid and are reentrant upon the electrode from which they were launched.
FIG. 2 is an embodiment of the invention in which a cylindroid upon which the receiving and transmitting electrodes are disposed at an angle with respect to the longitudinal axis of the cylindroid such that launched surface acoustic waves transverse the cylindroid a predetermined number of times before being received by the receiving electrodes.
FIG. 3 is an additional embodiment in which a continuous surface wave delay line is shown in which surface waves are launched in spiral fashion along the surface of a cylinder as a result of the disposition of the surface electrodes at a predetermined angle with respect to the axis of the cylinder.
FIG. 4 is a cut-away view of the transmitting electrode end of the cylinder shown in FIG. 3.

Referring now to FIG. 1, a continuous surface wave delay line device using curved surfaces is illustrated generally at 10. A piece of material such as crystalline quartz or $LiNbO_3$ or any other piezoelectric material suitable for the transmission of surface electro-acoustic waves has plated thereon interdigital electrodes by conventional thin film techniques. Piezoelectric substrate 12 in the instant embodiment is a *y* cut crystalline quartz plate one-fourth inch thick by 2 inches long in the X-direction and 1 ½ inches long in the Z-direction in which the Y-faces are optically polished to a flat finish while the X-axis ends are polished to cylindrical shapes with the cylinder axes parallel to the Z-axis. Interdigital electrodes of, for example, aluminum or any other material suitable for the generation of acoustic surface waves are fabricated on both Y-surfaces as illustrated. The electrodes are oriented so that surface acoustic waves are generated which propagate along the X-axis and around the cylindrical surfaces at a fundamental operating frequency of, for example, 60 MHz. In such a configuration no acoustic reflections occur from the cylindrical ends of the piezoelectric substrate 12 and little loss is experienced in cylindrical propagation so long as the acoustic wavelength is short compared to the radius of curvature of the cylindrical ends. In the embodiment illustrated by FIG. 1 a wavelength of 0.002 inch which corresponds to a frequency of approximately 60 MHz will propagate with no acoustic reflection and minimal loss around a radius of curvature of approximately 0.125 inch. Of course, the interdigital electrodes 14, 16, 18, and 20 are shown by way of illustration only and may comprise complex interdigital arrays of apodized comb structures in which many individual electrodes are present at varying spaces and of varying configuration. Considering electrode structure 14 as the input transducer, source 22 supplies pulsed or continuous electrical waveforms to this input transducer with a utilization device 24 such as a receiver being supplied by the output of output transducer 16. Of course, electrodes 18 and 20 may be either input or output electrodes depending only upon the particular requirements to be satisfied by the device.

This device is advantageous because the total delay time for a given length of delay material is greatly increased over that achievable with delay lines using single uncurved surfaces. In fact, if the acoustic wave is allowed to spiral around the crystal several times, delay times of several hundred microseconds may be achieved with approximately 2 inches of material. Since exotic and expensive materials, such as $LiNbO_3$, are usually employed for surface wave delay lines, the cost of long delay lines is greatly reduced.

Referring now to FIG. 2, a crystal capable of supporting surface acoustic waves consisting of Y-cut crystalline quartz is illustrated at 30. Interdigital electrodes 32 and 34 of the same type as illustrated by FIG. 1 are deposited upon the surface of substrate 30 at an angle ($\theta$) with respect to sides 36 and 38 which are parallel to each other and to a longitudinal axis, thus the surface acoustic wave launched from interdigital electrodes 32 and received by electrodes 34 is angled with respect to the parallel sides of the cylindroid and will spiral around the cylindroid along path 40 thereby providing a greatly increased delay path without any increase in the amount of material required. Of course, the angle ($\nu$) may be made as small or as large as desired thereby increasing or decreasing the number of times the launched surface acoustic wave will circle the cylindroid 30, thereby providing for a variation in the amount of delay time possible with the same amount of material. As described with respect to FIG. 1, any conventional input source 42 may drive electrodes 30 and utilization devices, such as pulse expander compressor systems in radars and displays in which recirculating delay lines requiring long delay times are required. This may be effected by the present technique with the output of output transducer 34 being supplied to a utilization device 44.

Referring now to FIG. 3, a further embodiment of the continuous surface wave delay line is illustrated in which a cylinder 50 is formed of piezoelectric material, such as quartz crystal, $LiNbO_3$ or PZT (Lead zirconate Titanate), or any other suitable electro-acoustic wave propagating material in which input transducer 52 which comprises an interdigital electrode array deposited upon the surface of cylinder 52 is supplied with input signals via a source 54 and output electrodes 56 similarly plated upon the surface of cylinder 50 which are coupled to a utilization device 58. In similar fashion to the embodiment disclosed in FIG. 2, surface electro-acoustic waves launched from electrodes 52 spiral around cylinder 50 along path 60 until they reach the output electrodes 56, thereby providing a greatly increased delay time for a relatively small amount of material. Such a delay device, of course, is relatively easy to package in contradistinction to the length of delay which would be required were electrodes 52 and 56 parallel to axis 62 of cylinder 50.

Electrodes 52 and 56 are angled from the perpendicular to cylinder axis 62. This angling of the interdigital electrodes provides the spiral path upon which launched electroacoustic waves travel and may be more clearly illustrated with reference to FIG. 4 in which a top view of cylinder 50 is illustrated. It may be seen that the electrodes 52 are tilted to an angle ($\theta$) to the perpendicular drawn to cylinder axis 62, hence, launched electroacoustic waves travel along path 72 and spiral around the cylinder.

While particular embodiments of the invention have been shown and described, various modifications and systems applications thereof will be apparent to those skilled in the art; for example, continuous surface wave devices as herein described may be fabricated on substrates other than those herein disclosed and may be used in computer memories, and as the recirculating memory of display devices. Additionally, the particular geometric configurations disclosed are by way of example only; and other continuous surfaces, such as, cones, spheres, etc. could utilize the present techniques. Additionally a spiral path will result due to the anisotropy of particular crystal structure of certain substrates and angling of the electrodes on these crystals is not required to cause the launched wave to follow a spiral path. Therefore, it is not intended that the invention be limited to the disclosed embodiments or the details thereof and departures may be made therefrom within the spirit and scope of the invention as defined in the appended claims.

What is claimed is:

1. A surface wave device comprising:

a single crystal piezoelectric substrate having a surface at least a portion of which is a nonplanar surface;

said nonplanar surface portion being capable of supporting surface acoustic waves traveling thereon; and electrode means disposed on said surface of said substrate having an input electrode portion for launching said surface waves on said substrate predominantly along a directional path comprising said nonplanar surface portion and an output electrode portion for deriving electrical signals from said surface waves.

2. A surface wave device in accordance with claim 1 wherein said input and output electrode portions comprise interdigital electrode comb arrays, each of which comprises a plurality of interdigital elements.

3. A surface wave device in accordance with claim 2 wherein the individual interdigital portions of said electrode arrays are at an angle to the direction of propagation of said transmitted surface wave.

4. A surface wave device comprising:

a substrate having a surface at least a portion of which is nonplanar, at least the major portion of said substrate comprising a single crystal piezoelectric body;

said nonplanar surface portion being capable of supporting a surface acoustic wave;

means disposed on said surface of said substrate for transmitting said surface acoustic wave along said surface and for deriving a signal from said wave; and the direction of propagation of said transmitted surface acoustic wave being predominantly along a nonreentrant path through said nonplanar surface portion.

5. A surface wave device comprising:

a single crystal piezoelectric substrate having a surface at least a portion of which is nonplanar;

said surface being capable of supporting acoustic waves traveling thereon;

electrode means disposed on said surface of said substrate;

said electrode means including an input electrode portion for launching a surface wave on said substrate and an output electrode portion;

said input and output electrode means being interdigital electrode comb arrays, each of which comprises a plurality of interdigital portions spaced from each other in accordance with the desired frequency response;

the individual interdigital portions of said electrode arrays extending perpendicular to the direction of propagation of said transmitted surface wave; and the locus of the midpoints of said individual interdigital portions of said electrode arrays lying in a path at an angle to the longitudinal axis of said substrate such that said launched acoustic wave travels in a spiral path on said surface.

6. A surface wave device in accordance with claim 5 wherein said substrate is configured as a cylindroid.

7. A surface wave device in accordance with claim 5 wherein said surface wave substrate is configured as a cylinder.

8. A surface wave device comprising:

a single crystal piezoelectric substrate having a surface at least a portion of which is nonplanar;

said surface being capable of supporting acoustic waves traveling thereon;

electrode means disposed on said surface of said substrate;

said electrode means including an input electrode portion for launching a surface wave on said substrate and an output electrode portion;

said input and output electrode means being interdigital electrode comb arrays, each of which comprises a plurality of interdigital portions spaced from each other in accordance with the desired frequency response; and the individual interdigital portions of said electrode arrays being at an angle to the direction of propagation of said transmitted surface wave, and the locus of the midpoints of said individual interdigital electrode portions of said electrode arrays lying in a path at an angle to the longitudinal axis of said substrate such that said launched acoustic wave travels in a spiral path on said surface.

9. A surface wave device in accordance with claim 8 wherein said substrate is configured as a cylindroid.

10. A surface wave device in accordance with claim 8 wherein said substrate is configured as a cylinder.

11. A surface wave delay line comprising:

a single crystal piezoelectric substrate capable of supporting acoustic waves traveling on the surface of said substrate;

said surface including at least a portion which is nonplanar;

first interdigital electrode array means disposed upon said surface of said piezoelectric substrate for directionally launching an acoustic surface wave thereon predominantly along a surface path which includes said nonplanar surface portion; and said launched acoustic wave being received by second interdigital electrode array means after traversing said surface a plurality of times.

12. A surface wave delay line comprising:

a single crystal piezoelectric substrate capable of supporting acoustic waves traveling on the surface of said substrate, said surface including at least portions which are nonplanar;

interdigital electrode array means disposed upon said surface of said piezoelectric substrate for launching an acoustic wave thereon;

said launched acoustic wave being received by said interdigital electrode array after traversing said surface a predetermined number of times; and the electrode means being disposed at an angle to the longitusinal axis of said substrate such that launched electro-acoustic waves traversing said surface travel in a spiral path on said surface and laterally progress along said substrate.

13. A surface wave delay line in accordance with claim 12 wherein said substrate is a cylindroid.

14. A surface wave delay line in accordance with claim 12 wherein said substrate is cylindrical.

15. In combination:

a solid body comprising a single crystal capable of supporting acoustic waves traveling on a surface thereof such that said acoustic waves propagate around said solid body at least twice; and electrode means disposed on said surface, said electrode means including an input electrode portion and an output electrode portion for launching and receiving said surface wave, said electrodes being angled with respect to a longitudinal axis of said solid body such that with each propagation of a wave around said solid body said launched acoustic surface wave is displaced a predetermined amount along said axis.

16. A combination in accordance with claim 15 wherein said solid body is a cylinder.

17. A combination in accordance with claim 15 wherein said substrate is a cylindroid.

* * * * *